United States Patent [19]

Shigehiro

[11] 4,302,475

[45] Nov. 24, 1981

[54] METHOD OF PRODUCING MILO STARCH

[75] Inventor: Motoichi Shigehiro, Kashiwara, Japan

[73] Assignee: Bohsei Enterprise, Ltd., Japan

[21] Appl. No.: 160,941

[22] Filed: Jun. 19, 1980

[30] Foreign Application Priority Data

Jun. 20, 1979 [JP] Japan .................................. 54-78546

[51] Int. Cl.³ ............................ A23L 1/00; A23K 1/00
[52] U.S. Cl. ......................................... 426/53; 127/67;
127/69; 127/70; 426/52; 435/98; 435/99;
435/139; 435/274; 435/275; 536/102; 536/105
[58] Field of Search .................. 536/102, 105; 127/67,
127/69, 70; 435/98, 99, 139, 274, 275; 426/52,
53

[56] References Cited

U.S. PATENT DOCUMENTS

| | | | |
|---|---|---|---|
| 2,143,358 | 1/1939 | Walsh et al. | 435/139 |
| 2,343,048 | 2/1944 | Eble et al. | 127/70 |
| 3,123,502 | 3/1964 | Henry et al. | 127/70 |
| 3,782,964 | 1/1974 | Knight | 435/99 |

FOREIGN PATENT DOCUMENTS

| | | | |
|---|---|---|---|
| 618320 | 4/1961 | Canada | 536/105 |
| 5011542 | 3/1977 | Japan | 435/139 |
| 17175 | of 1912 | United Kingdom | 435/139 |
| 1095268 | 12/1967 | United Kingdom | 536/105 |

OTHER PUBLICATIONS

Whistler; P. "Starch Chemistry & Technology", PTII, Industrial Aspects, Chapter I, Watson, S., PTIII, "Milo" pp. 22–50.

Primary Examiner—Wilbert J. Briggs, Sr.
Assistant Examiner—Herbert J. Lilling
Attorney, Agent, or Firm—Eric P. Schellin

[57] ABSTRACT

A method of producing milo starch which comprises the steps of immersing refined milo in a weakly acidic solution of sodium chlorite to remove the tannin, grinding the same to provide a starch slurry, and removing the proteins from the latter. The method is capable of producing milo starch of high purity at low cost without causing odor pollution.

A method of producing milo starch includes, besides the steps described above, the steps of lactic-fermenting the waste liquid resulting from the immersion of white grain milo, concentrating the liquid, mixing the concentrated liquid with the bran resulting from the refining of milo, and drying the mixture to provide milo feed. By this method, it is possible to produce milo starch without having to provide any special equipment for treating the waste water.

1 Claim, 2 Drawing Figures

METHOD OF PRODUCING MILO STARCH

BACKGROUND OF THE INVENTION

Heretofore, milo starch has been produced by methods similar to those for producing corn starch.

Corn starch is produced by immersing the whole raw material to allow it to swell, grinding, separating the ground material into a starch slurry and dregs, and drying the starch slurry. Further, the dregs are dried and used as a feedstuff. In this process, it is necessary to subject the whole raw material, including the dregs, to treatments, such as drying, thus requiring large equipment for production. Further, a large amount of fuel is consumed for drying, requiring high fuel costs. Additionally, the method described above uses sulfurous acid for the purpose of sterilization, which acid is a major cause of odor pollution. Moreover, before the waste water from the process can be discharged into rivers or the like, the sulfurous acid must be removed from the waste water, involving an additional cost of waste water treatement.

As described above, the conventional method requires large production equipment, high fuel cost, and the additional cost of waste water treatment, all adding to a high production cost.

SUMMARY OF THE INVENTION

This invention has been developed to eliminate the drawbacks described above. A first object of the invention is to provide a method of producing milo starch comprising the steps of refining raw material milo to white grain milo, immersing the latter in a weakly acidic solution of sodium chlorite for sterilization and removal of tannin as well as for decolorization, removing the swelled milo from the solution, grinding the same to provide a starch slurry, separating the embryo buds from the latter, and removing the proteins from said starch slurry to provide a starch slurry of high purity. According to this method, since milo starch is produced by removing the bran, which forms said dregs, in advance from the raw material, and grinding only the white grain milo to provide a starch slurry, the drying cost can be greatly reduced in contrast to the conventional method of production of corn starch. Further, since sodium chlorite is used for sterilization of raw material, there is no danger of causing odor pollution as in the conventional method of producing corn starch.

A second object of the invention is to provide a method of producing milo starch comprising the steps described above and the steps of lactic-fermenting the immersion liquid resulting from the immersion of white grain milo while maintaining it at a suitable temperature, concentrating the same, mixing the concentrated solution with the bran resulting from the refining of milo, and drying the mixture to provide milo feed, thereby eliminating the need for providing special equipment for waste water treatment.

A third object of the invention is to provide a method of producing milo starch of higher purity, wherein decantation and flotation are used in removing substantial proteins from said starch slurry, thereby facilitating the removal of traces of proteins remaining in the starch slurry.

These and other objects of the invention will become more apparent from the following description given with reference to the accompanying drawings.

DETAILED DESCRIPTION OF THE INVENTION

Figure 1:
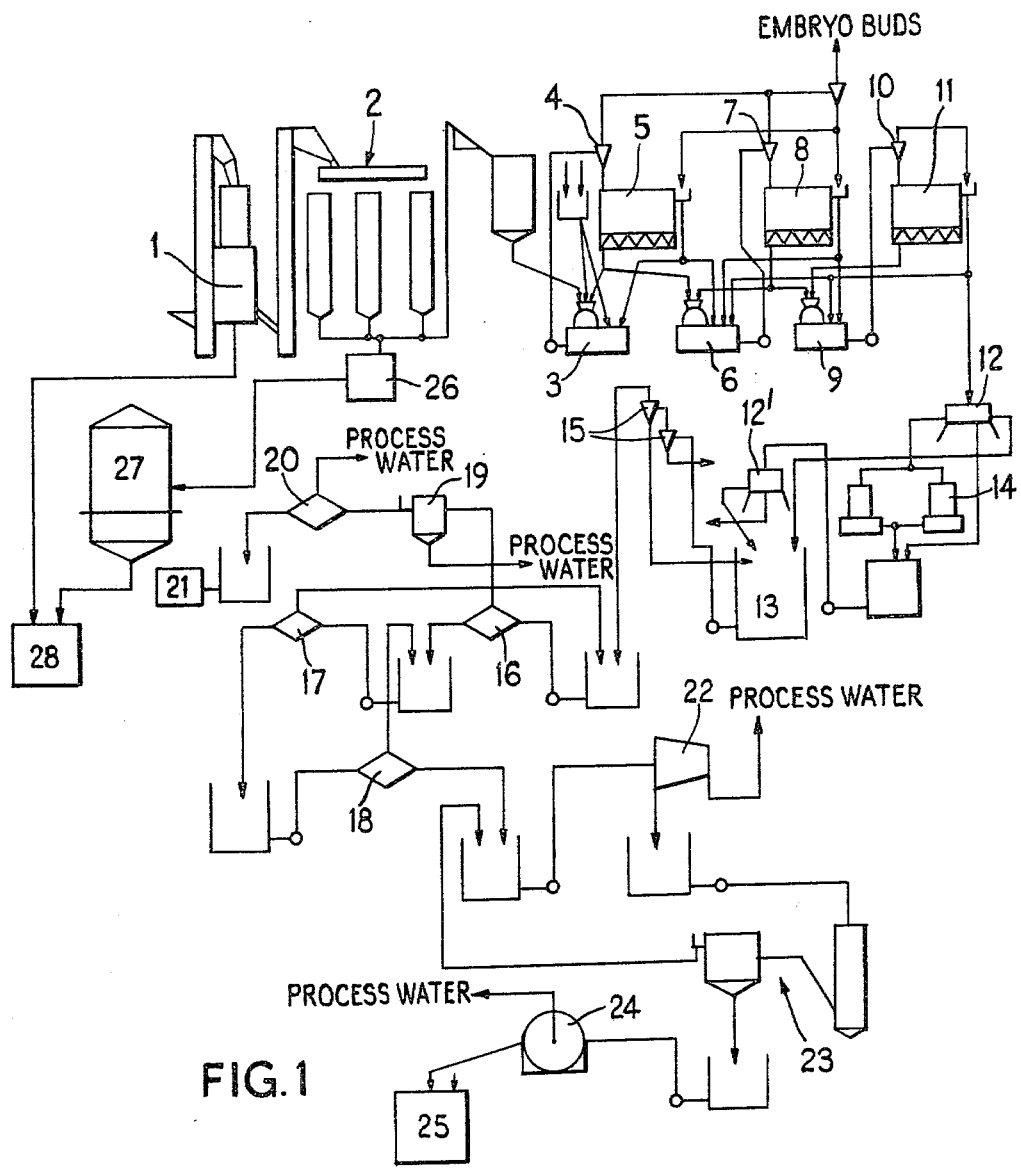
FIG. 1 is a flow diagram, illustrating an embodiment of the invention.
Figure 2:
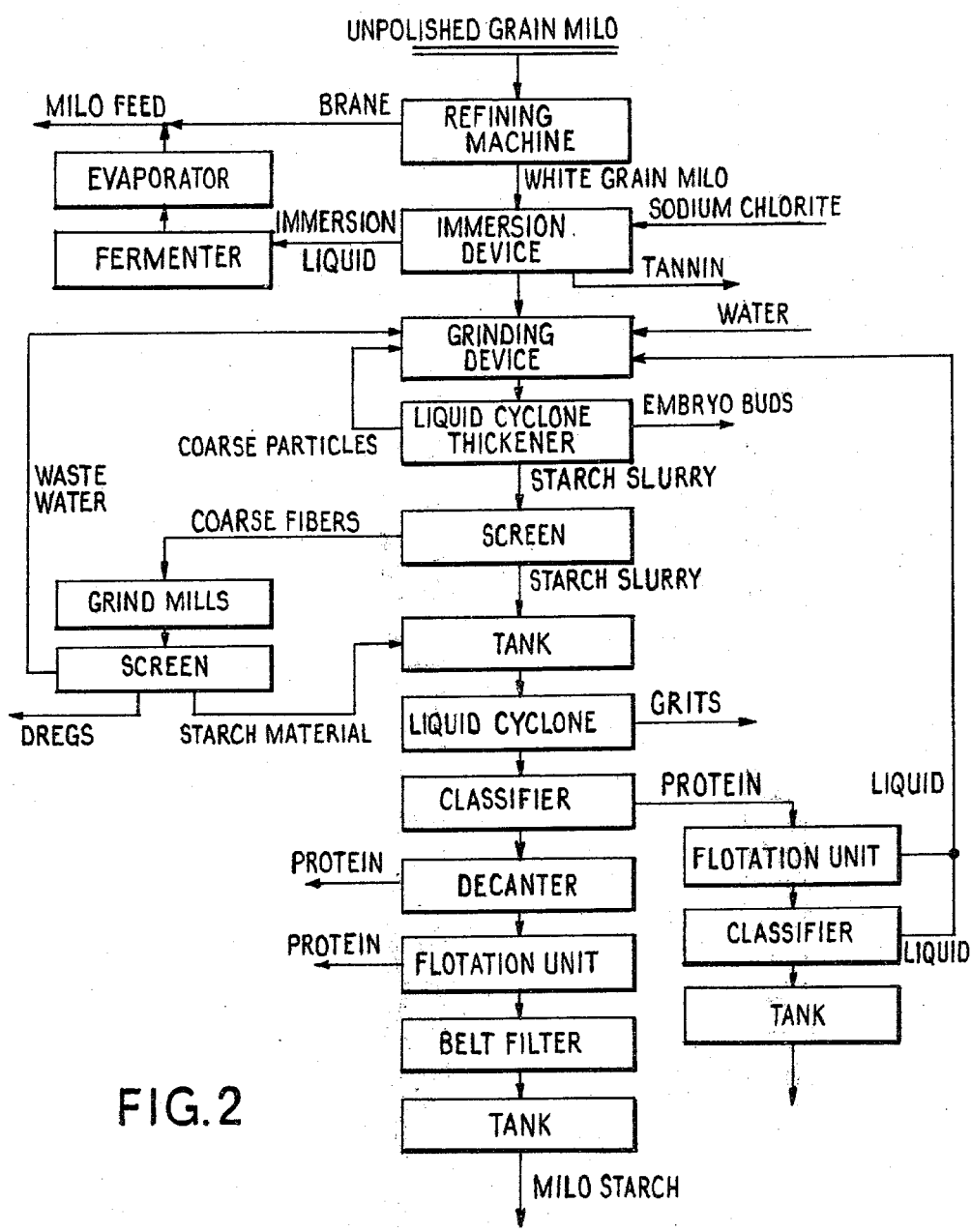
FIG. 2 is a block diagram, illustrating said embodiment.

An embodiment of the invention will now be described with reference to the flow diagram shown in FIG. 1. Unpolished grain milo, which is raw material, is refined by a refining machine 1 for removal of the bran so as to provide white grain milo, which is then received by an immersion device 2. The bran obtained by refining, which amounts to about 20% by weight of the total amount of unpolished grain milo, is recovered and mixed with a waste immersion liquid to be later described, so as to provide a feedstuff. In the immersion device 2, the white grain milo is immersed in a weakly acidic solution, prepared by using a slight amount of sodium chlorite, for sterilization, at a temperature of 45°–47° C., for about 12 hours on the counter-current system to achieve removal of tannin and decolorization. Upon completion of the immersion, the swelled white grain milo is taken out of the immersion liquid and fed to a grinding device 3, where it is ground with water being added thereto. It is then passed through a liquid cyclone 4 and then through a thickener 5, whereby it is divided into coarse particles, starch slurry and embryo buds. The coarse particles are then ground by a subsequent grinding device 6 and passed through a liquid cyclone 7 and then through a thickener 8, whereby they are subdivided into less coarse particles, starch slurry and embryo buds, said less coarse particles being passed through a liquid cyclone 10 and then through a thickener 11, for further division, with the remaining particles being then returned to the grinding device 6 at the preceding stage. This series of operations is repeated a number of times to convert white grain milo into starch slurry. The embryo buds thus isolated are recovered for separate use. The starch slurry is passed through a screen 12 of about 300-mesh, whereby the coarse fibers in the starch slurry which have swelled with the lapse of time are removed and the filtrate is received in a tank 13. The coarse fibers thus removed are ground into ultrafine particles by grind mills 14, said particles being passed through a screen 12'. The starch material is recovered and received in said tank 13, while the dregs are utilized as a feedstuff, the waste water being returned to the grinding facilities included in the system. The starch slurry received in the tank 13 is fed to a liquid cyclone 15, where a slight amount of grits present in the starch slurry is removed, followed by removal of some of the proteins by a first classifier 16; the remaining proteins being substantially removed by a second classifier 17 and a third classifier 18. The proteins removed by the second classifier 17 are returned to the first classifier 16, while those removed by the third classifier 18 are returned to the second classifier 17. The proteins removed by the first classifier 16 are dehydrated by a flotation unit 19 and then by a classifier 20 and are dried and then received in a tank 21 for separate use. The liquid removed by the flotation unit 19 and classifier 20 is returned to the grinding steps, etc., for reuse.

The starch slurry passed through the third classifier 18 for removal of proteins is treated by a decanter 22 and a flotation unit 23 for removal of their traces of proteins, thus providing starch slurry of high purity, which is then dehydrated by a belt filter 24 and received in a tank 25 for use as milo starch in a separate hydrolysis plant. The discharge liquid from the decanter 22 and the liquid removed by the belt filter 24 are reused as process water.

On the other hand, part of the immersion liquid discharged from the immersion device 2 upon completion of the immersion of white rain milo is fed to the grinding device 3 for use as process water, while the remainder is received in a fermenter 26, where it is lactic-fermented at a temperature of 45°–47° C. and a pH of 5–6 and then fed to an evaporator 27 for concentration, followed by being mixed with the bran discharged from the refining machine 1, the mixture being dried in a drier 28 to provide milo feed for use as a livestock feedstuff. If part or all of the proteins recovered in the above process are added to said mixture and the latter is dried, there will be obtained milo gluten feed.

The slight amount of sodium chlorite used for sterilization in the immersion device 2 is mostly decomposed into chlorous acid in the immersion device 2 as well as used for removal of proteins and for decolorization, with the result that it is never discharged outside the system. In addition, it may disappear if sodium sulfite is added thereto for reduction.

As has been described so far, according to the invention, raw material milo is refined to white grain milo, which is treated for removal of tannin and for decolorization, whereupon it is ground to provide starch slurry from which the embryo buds and then the proteins are removed. Thus, the proteins can be easily removed from milo, which is difficult to separate into starch and proteins, and starch slurry, which is milo starch of high purity, can be produced. Particularly, if decantation and flotation are incorporated, the traces of proteins remaining in the starch slurry can be easily removed, so that milo starch of even higher purity can be produced.

Moreover, according to the invention, since bran, which froms dregs, is removed in advance from raw material and white grain milo alone is ground to provide starch slurry for the production of milo starch, the invention greatly reduces the cost involved in drying, as compared with the conventional method of producing corn starch.

Since sodium chlorite is used for sterilization of raw material, there is no danger of causing odor pollution, as in the conventional production of corn starch.

Since the waste liquid from the immersion liquid is used to produce a feedstuff by being mixed with the bran resulting from the refining of raw material milo, there is no need to provide special equipment for treatment of waste water.

Therefore, with the method of the invention, it is possible to produce milo starch of high purity at low cost without causing odor pollution or waste water pollution.

In addition, the process for producing milo feed or the process for producing milo gluten feed, described above, may be implemented separately from the process of producing milo starch.

What is claimed is:

1. A method of producing milo feed comprising the steps of lactic-fermenting immersion liquid resulting from immersion of white grain milo in a weakly acidic solution of sodium chlorite while maintaining the immersion liquid at a suitable temperature, concentrating the lactic-fermented liquid, mixing the concentrated liquid with bran resulting from refining of raw material milo, and drying the mixture to provide milo feed.

* * * * *